United States Patent [19]

Smith

[11] Patent Number: 5,358,001
[45] Date of Patent: Oct. 25, 1994

[54] AIR VALVE FOR USE IN AN INFLATABLE BLADDER

[76] Inventor: Eldon F. Smith, 5911 Princeton-Glendale Rd., Hamilton, Ohio 45011

[21] Appl. No.: 206,630
[22] Filed: Mar. 7, 1994
[51] Int. Cl.⁵ .............................................. F16K 15/20
[52] U.S. Cl. .............................. 137/223; 251/149.1; 446/224
[58] Field of Search ............... 137/223; 251/149.1; 446/220, 222, 224

[56] References Cited

U.S. PATENT DOCUMENTS

| | | | |
|---|---|---|---|
| 1,758,625 | 5/1930 | Saul | 137/223 X |
| 1,951,565 | 3/1934 | Sonnett | 137/223 X |
| 1,990,374 | 2/1935 | Goldsmith | 137/223 |
| 1,997,955 | 4/1935 | Weaver | 137/223 X |
| 2,085,369 | 6/1937 | Kilborn | 137/223 X |
| 3,410,299 | 11/1968 | Whittington | 137/223 |
| 3,422,837 | 1/1969 | Boyer et al. | 137/223 X |
| 3,768,501 | 10/1973 | Elson et al. | 446/222 X |

Primary Examiner—John Rivell
Attorney, Agent, or Firm—Charles R. Wilson

[57] ABSTRACT

An air valve for use in an inflatable bladder guards against accidental puncturing of the bladder by an inflating needle. The air valve comprises a main body member with a core which has a neck at one end and an inflating needle passageway extending through it. A chamber is interposed in the passageway. The air valve also includes an air sealing plug for positioning in the chamber and a protective bonnet positioned on the second end of the main body member. The main body member has an annular sealing flange extending radially from the first end and, in one embodiment, a snap-in retaining flange extending radially from the neck such that a bladder and an outer casing are trapped between the two flanges in a sealing relationship. The protective bonnet has at least one air escape opening to allow pressurized air from the inflating needle to pass into the bladder.

17 Claims, 2 Drawing Sheets

AIR VALVE FOR USE IN AN INFLATABLE BLADDER

This invention relates to an air valve. More particularly, the invention relates to a puncture-proof air valve for use in an inflatable bladder. Inflatable bladders are very common. They are particularly used in sportsballs such as soccer balls and volley balls. They are also used in footballs, punching bags, beach balls and in some basketballs. In most instances, the sportsball comprises the inflatable bladder which holds pressurized air and an outer casing which provides durability and feel to the ball.

Commercially available bladders hold pressurized air to different degrees depending on their material of construction. Some bladders need to be inflated on a weekly basis while others on a monthly basis. All known bladders for sportsballs have an air valve which is sealed into a wall of the bladder. An inflating needle is inserted into the valve and pressurized air from an air pump is forced into the bladder until the desired air pressure is attained. A problem which is experienced particularly when the ball is first assembled in the factory and occasionally in a non-commercial setting is that of the inflating needle puncturing the bladder wall. When the bladder is substantially deflated, a careless insertion of the inflating needle into the air valve will damage the bladder wall opposite the air valve. The problem may be noticed immediately in case of a significant hole or later during shipment or use in the case of pin-hole type damage. In either case, the bladder is ruined and the ball or at least the bladder must be discarded. For the factory assembling the ball for sale, the ruined bladder represents lost profits. For the individual, the ruined bladder represents an initial annoyance and possibly a lengthy dissatisfaction with the ball's manufacturer.

The problem of damaging the bladder of a ball during an inflation step is known to manufacturers in particular. Heretofore, the solution has been to instruct its personnel to exercise more care in inserting the inflating needle into the bladder. The individual learns of the problem the hard way and then exercises more care in the future. An air valve which protects against the problem ever occurring is needed. In accord with this need, there has been developed a puncture-proof air valve for use in an inflatable bladder. The air valve prevents any inflating needle from accidently contacting the bladder's wall and causing damage. The air valve is also capable of being sealed to the bladder wall in an air-tight manner and capable of readily receiving an inflating needle to introduce pressurized air to the bladder. It is economical to produce, readily assembled into the bladder and is reliable in use.

SUMMARY OF THE INVENTION

A puncture-proof air valve for use in an inflatable bladder guards against accidental damage to the bladder by careless use of an inflating needle. The air valve comprises a main body member having a core, an air-sealing plug within the core and a protective bonnet. An annular sealing flange extends radially and a neck extends axially from the first end of the main body member. In one embodiment of the invention, the neck further has an annular snap-in retaining flange extending radially therefrom. It is spaced from the sealing flange so as to be capable of engaging a bladder and an outer casing therebetween. The main body member also has an inflating needle passageway and a chamber interposed in the passageway. The air sealing plug with a self-sealing inflating needle passageway is positioned in the chamber. The protective bonnet is positioned on a second end of the main body member. The bonnet has at least one air escape opening to allow pressurized air from the inflating needle to pass through it and into the bladder.

DETAILED DESCRIPTION OF THE INVENTION

The puncture-proof air valve of the invention is described in detail in the following paragraphs and with particular reference to the drawings. The air valve is particularly useful in soccer balls and volleyballs which have bladders made from a thermoplastic polyurethane elastomer, preferably a polyester-based or polyether-based polyurethane. Other thermoplastic elastomeric resins including polyvinyls, polyesters and polyethers are useful in forming the bladder. The bladder itself also can be formed from a combination of resin films where each resin film contributes a desired property, e.g. air retention, abrasion resistance, etc. The air valve is useful as well with inflatable bladders made in other shapes.

Figure 1:
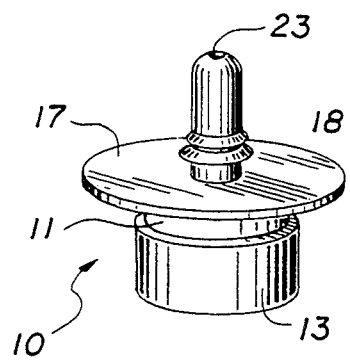
FIG. 1 is a perspective view of the puncture-proof air valve of the invention.
Figure 2:
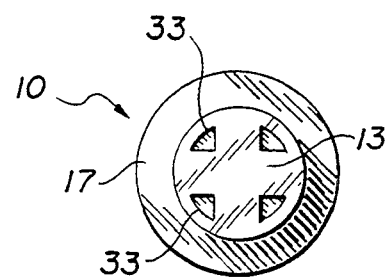
FIG. 2 is a bottom view of the puncture-proof air valve of FIG. 1.
Figure 3:
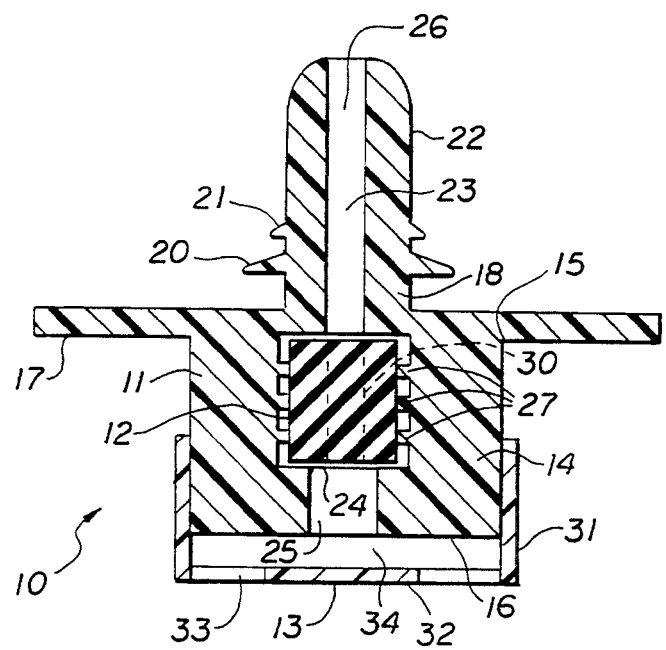
FIG. 3 is an elevational view in section of the puncture-proof air valve of FIG. 1.
Figure 4:
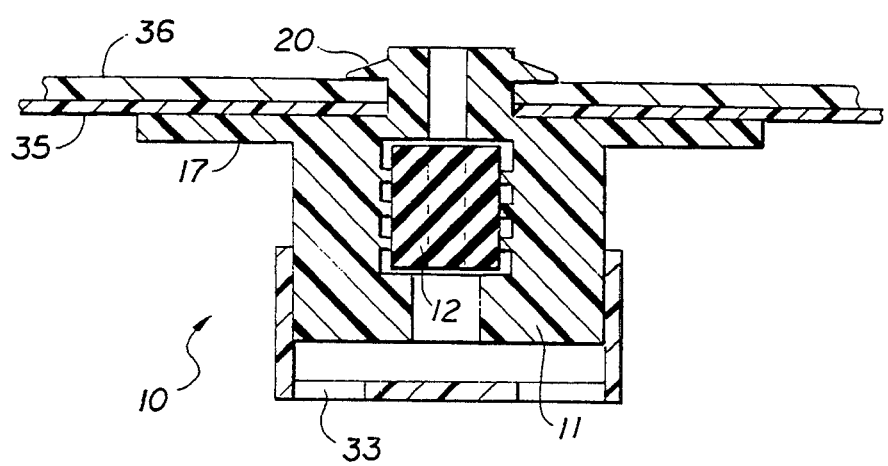
FIG. 4 is a partial elevational view in section of the puncture-proof air valve of FIG. 1 showing its assembly in an inflatable bladder and outer casing.

With reference to FIGS. 1–3 there is shown the puncture-proof air valve 10 of the invention. The air valve comprises a main body member 11, an air sealing plug 12 and a protective bonnet 13. Each of the components of the air valve and the air valve's assembly in an inflatable bladder and outer casing as shown in FIG. 4 are described in detail in the following paragraphs.

The main body member 11 of the air valve 10 has a core 14 with a substantially flat first end 15 and a substantially flat second end 16. The core 14 as shown is cylindrical-shaped and is preferred, though other shaped cores are feasible. The main body member also has an annular sealing flange 17 extending radially from the first end and a neck 18 extending axially from the first end. The neck 18 as shown in FIGS. 1–3 has a snap-in retaining flange 20 extending radially from its side walls. The sealing flange and the retaining flange are spaced apart a sufficient distance to allow a bladder wall and an outer casing wall to be slipped in between them in assembling the ball as further discussed below.

The neck 18 has a cutting guide flange 21 above the snap-in retaining flange 20, and a neck extension 22 extending axially from the neck 18. As evident in FIG. 4, the neck extension 22 is cut from the neck 18 of the valve 10 after the valve is assembled into the bladder and encased in an outer casing.

An inflating needle passageway 23 extends completely through the neck 18 and the core 14 of the main body member 11 of the air valve 10. Its diameter is dimensioned to allow the inflating needle to fully be inserted for inflating purposes and be removed when the bladder is inflated to the desired degree. A chamber 24 is interposed in the needle passageway within the core. A lower portion 25 of the passageway is generally larger than an upper portion 26 so as to accommodate the physical insertion of the air-sealing plug 12 into the chamber. As best seen in FIG. 3, the chamber 24 has a greater diameter than the inflating needle passageway 23 and is centered about the passageway. A set of circumferentially extending compression ridges 27 extend around the chamber walls. At least two ridges are used, while preferably two to five ridges are used for optimum compression contact with the air sealing plug 12.

The air sealing plug 12 is dimensioned to fit into the chamber of the main body member's core and make compression contact with the chamber's compression ridges. The plug 12 also has an inflating needle passageway 30 extending through its center which is in alignment with the needle passageway 23 extending through the core. The plug 12 is made of a compressible material and the passageway 30 is dimensioned such that a needle is capable of passing through it, yet upon removal of the needle, the passageway wall expands towards itself to completely close. The nature of the plug 12 is such that an air-tight seal is created at the chamber compression ridges 27 and within its needle passageway 30. This ensures that pressurized air within the bladder cannot escape through the valve 10.

A protective bonnet 13 is permanently positioned on the main body member 11's second end. The bonnet is made of a material capable of absorbing a force from the inflating needle such that the bladder wall opposite the air valve does not receive that force. The bonnet is preferably made of a rigid or semi-rigid plastic which is capable of bonding to the main member. An adhesive is used for the bonding or, preferably the bonnet is spin welded to the main member. As evident in FIG. 3, the bonnet 13 overlies the second end of the main body member and covers the inflating needle passageway 23 extending therethrough. The bonnet 13 has cylindrical-shaped side walls 31 and a substantially flat end cap 32 which together create a cavity. At least one air escape opening 33 is preferably placed in the end cap 32 to allow pressurized air from the inflating needle to escape. As best seen in FIG. 2, four off-center air escape openings 33 are created in the end cap. As should be evident, the bonnet's end cap prevents the inflating needle from traveling beyond it, thus ensuring that the bladder is never contacted by the inflating needle. The shape of the protective bonnet is not important, it merely being necessary that a cavity 34 exist within it.

In assembling the air valve in a bladder and with reference to FIG. 4, the sealing flange 17 of the air valve 10 is located within the interior of the bladder 35 while the snap-in retaining flange 20 remains on the exterior of the bladder 35 and the outer casing 36. A purpose of the retaining flange is to attach the air valve to the casing of the ball to ensure that the valve will not be pushed back through the hole in the casing when the air inflating needle is inserted. Thus, the retaining flange secures the air valve in place relative to the outer casing of the ball. The neck extension 22 as shown on the valve in FIGS. 1–3 is severed between the snap-in retaining flange 20 and a cutting guide flange 21 after the bladder is encased with its casing.

Figure 5:
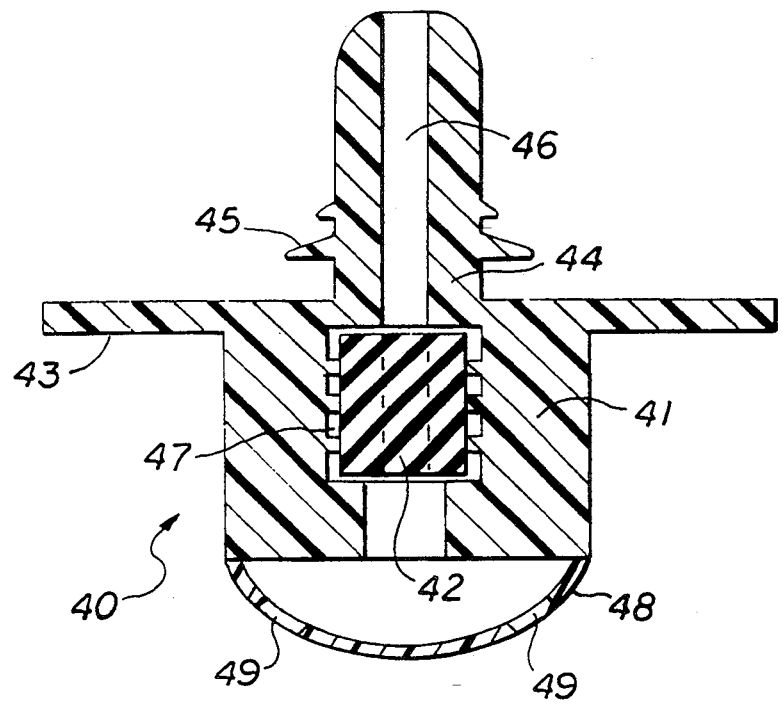
FIG. 5 is an elevational view in section of another puncture-proof air valve of the invention.
Figure 6:
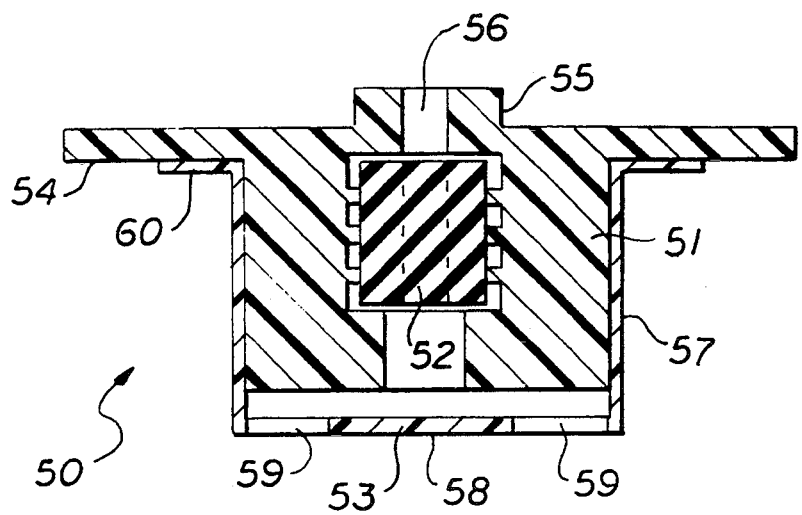
FIG. 6 is an elevational view in section of still another puncture-proof air valve of the invention.

With reference to FIGS. 5 and 6, there are shown two other embodiments of the air valve of the invention. The air valve 40 of FIG. 5 has a main body member 41 and an air sealing plug 42 similar to those of the air valve 10 described above. The main body member also has a sealing flange 43 extending radially from its first end, a neck 44 extending axially from its first end, and a snap-in retaining flange 45 extending radially from the neck. An inflating needle passageway 46 extends through the main body member and includes a chamber 47. The protective bonnet 48 is domed-shaped, however, with an end wall which is bonded onto the flat second end of the main body member 41. The bonnet 48 has three air escape openings 49 positioned equi-distance around the bonnet and off-center from the inflating needle passageway 46. The advantage of the dome-shaped protective bonnet 48 is its ease of manufacture and ease of bonding to the main body member of the air valve.

The air valve 50 of FIG. 6 is designed for use in a bladder when it is desired to adhesively bond the air valve to the outer casing. In such a case, the snap-in retaining flange found on the air valve of FIGS. 1–4 and 5 is not needed. Thus, the air valve 50 comprises a main body member 51, air sealing plug 52 and protective bonnet 53. The main body member includes a sealing flange 54, neck 55, and inflating needle passageway 56 similar in design and operation as above described. The protective bonnet 53 has a cylindrical-shaped side wall 57, a flat end cap 58 at one end with air escape openings 59 and a rim 60 extending radially from a second end of the side wall 57. The diameter and height of the side wall 57 are dimensioned so that the bonnet 53 fits over the main body member's core with the rim 60 sealed to the sealing flange 54. A cavity is formed at the second end of the bonnet. The advantage of the protective bonnet 53 is its ability to readily form a permanent bond to the sealing flange of the main body member and the inherent reinforcement provided by the side wall to the main body member core. This latter advantage lessens the chance of the core spreading out and the inflating needle pushing the air sealing plug out of its chamber.

The main body member of the air valves of the invention is made of a thermoplastic elastomer, preferably a polyester-based or polyether-based polyurethane. Such elastomers are optimum for forming an air-tight long lasting bond with the bladder, especially when also made of the same elastomer. Preferably, the main body member and the protective bonnet are made of the same elastomer as the bladder for a bond which is able to withstand outdoor weather extremes and physical forces such as a kicking or hitting force.

While the invention has been described in detail, it should be understood various modifications can be made. All such modifications are considered within the scope of the appended claims.

I claim:

1. A puncture-proof air valve for use in an inflatable bladder to intermittently receive an inflating needle for inflating the bladder with pressurized air and providing an air-tight seal when the needle is removed therefrom, said valve comprising:

(a) a main body member having a core with a first end and a second end, wherein said core has an annular sealing flange extending radially from said first end and a neck extending axially from said first end, and further wherein the main body member has an inflating needle passageway extending through its neck and its core and a chamber interposed in said passageway;

(b) an air-sealing plug positioned in the chamber of the core of the main body member, said plug having a self-sealing inflating needle passageway extending through it and in alignment with the inflating needle passageway of the core; and (c) a protective bonnet positioned on the second end of the core of the main body member, said bonnet having at least one air escape opening in a wall thereof to allow the pressurized air from the inflating needle to pass therethrough and into the inflatable bladder, further wherein the bonnet is capable of absorbing a force from the inflating needle to prevent said force from being transmitted to the bladder.

2. The puncture-proof air valve of claim 1 wherein the air escape opening in the wall of the protective bonnet is off-center from the air inflating needle passageway extending through the core of the main body member.

3. The puncture-proof air valve of claim 1 wherein the protective bonnet is permanently bonded to the second end of the core.

4. The puncture-proof air valve of claim 3 wherein the core is cylindrical-shaped and the protective bonnet has a cylindrical-shaped side wall which is dimensioned to fit over the cylindrical-shaped core and be permanently bonded thereto.

5. The puncture-proof air valve of claim 1 wherein the protective bonnet is permanently bonded to the annular sealing flange of the main body member.

6. The puncture-proof air valve of claim 5 wherein the core of the main body member is cylindrical-shaped and the protective bonnet has a cylindrical-shaped side wall with an annular rim extending radially therefrom such that the cylindrical-shaped side wall fits over the cylindrical-shaped core and the annular rim is permanently bonded to the annular sealing flange of the main body member.

7. The puncture-proof air valve of claim 1 wherein the protective bonnet is dome-shaped.

8. The puncture-proof air valve of claim 1 further wherein the neck further has an annular snap-in retaining flange extending radially therefrom and spaced from the sealing flange so as to be capable of engaging the bladder and an outer casing therebetween.

9. The puncture-proof air valve of claim 1 wherein the air sealing plug is made of a compressible material.

10. The puncture-proof air valve of claim 9 further wherein the chamber interposed in the inflating needle passageway of the main body member has a set of compression ridges extending circumferentially therearound for compression sealing to the air sealing plug.

11. A puncture-proof air valve for use in an inflatable bladder to intermittently receive an inflating needle for inflating the bladder with pressurized air and providing an air-tight seal when the needle is removed therefrom, said valve comprising:

(a) a main body member having a cylindrical-shaped core with a first end and a second end, wherein said core has an annular sealing flange extending radially from said first end and a neck extending axially from said first end, and further wherein the neck has an annular snap-in retaining flange extending radially therefrom and spaced from the sealing flange so as to be capable of engaging the bladder and an outer casing therebetween and the main body member has an inflating needle passageway extending through its neck and its core with a chamber interposed in said passageway;

(b) an air-sealing plug positioned in the chamber of the core of the main body member, said plug having a self-sealing inflating needle passageway extending through it and in alignment with the inflating needle passageway of the core; and (c) a protective bonnet permanently bonded onto the second end of the core of the main body member, said bonnet having a wall positioned below the inflating needle passageway which is capable of absorbing a force from the inflating needle to prevent said force from being transmitted to the bladder and further said wall having at least one air escape opening off-center from the air inflating needle passageway to allow the pressurized air from the inflating needle to pass therethrough and into the inflatable bladder.

12. The puncture-proof air valve of claim 11 wherein the protective bonnet has a cylindrical-shaped side wall which is dimensioned to fit over the cylindrical-shaped core.

13. The puncture-proof air valve of claim 11 wherein the protective bonnet is permanently bonded to the annular sealing flange of the main body member.

14. The puncture-proof air valve of claim 13 wherein the protective bonnet has a cylindrical-shaped side wall with an annular rim extending radially therefrom such that the cylindrical-shaped side wall fits over the cylindrical-shaped core and the annular rim is permanently bonded to the annular sealing flange of the main body member.

15. The puncture-proof air valve of claim 11 wherein the protective bonnet is dome-shaped.

16. The puncture-proof air valve of claim 11 wherein the air sealing plug is made of a compressible material.

17. The puncture-proof air valve of claim 16 further wherein the chamber interposed in the inflating needle passageway of the main body member has a set of compression ridges extending circumferentially therearound for compression sealing to the air sealing plug.

* * * * *